(12) United States Patent
Johnsen

(10) Patent No.: US 6,813,984 B1
(45) Date of Patent: Nov. 9, 2004

(54) ATTACHING DEVICE

(76) Inventor: Anders Johnsen, Alderbäcken 35, Borlänge, SE-781 93 (SE)

( * ) Notice: Subject to any disclaimer, the term of this patent is extended or adjusted under 35 U.S.C. 154(b) by 0 days.

(21) Appl. No.: 09/462,535

(22) Filed: Mar. 27, 2000

(30) Foreign Application Priority Data

Jul. 8, 1997 (SE) ............................. 9702648

(51) Int. Cl.[7] .............................. B23Q 3/12; B27B 5/32; F16D 1/04
(52) U.S. Cl. ............................. 83/481; 83/666; 83/676; 83/698.41; 125/13.01; 403/13; 403/14; 403/374.4; 451/342
(58) Field of Search .................. 83/698.41, 698.11, 83/698.31, 666, 676, 481, 482, 663; 82/160; 269/309; 279/141, 143, 144, 145, 90, 91; 403/13, 14, 374.1, 374.2, 374.3, 374.4, 374.5, 388, 409.1; 409/233; 30/388; 125/13.01, 15; 451/342, 343; 483/30, 31

(56) References Cited

U.S. PATENT DOCUMENTS

| | | | | |
|---|---|---|---|---|
| 1,572,393 A | | 2/1926 | Koerner ...................... 83/663 |
| 2,586,530 A | * | 2/1952 | Godfrey ...................... 30/388 |
| 3,600,999 A | * | 8/1971 | Daniels ............... 83/698.31 X |
| 4,428,120 A | * | 1/1984 | Kobayashi et al. .. 83/698.41 X |
| 4,484,498 A | | 11/1984 | Kanno et al. ................. 82/160 |
| 4,976,575 A | | 12/1990 | Kappelhof et al. ......... 409/233 |
| 5,107,737 A | * | 4/1992 | Tagliaferri ................ 83/676 X |
| 5,167,478 A | | 12/1992 | Ramunas .................... 409/234 |
| 5,199,223 A | * | 4/1993 | Rudolf et al. ............. 83/666 X |
| 5,244,322 A | * | 9/1993 | Schweizer et al. .......... 409/233 |
| 5,423,358 A | * | 6/1995 | Rautio ................ 83/698.41 X |
| 5,887,579 A | * | 3/1999 | Eriksson et al. ..... 125/13.01 X |

FOREIGN PATENT DOCUMENTS

| | | | | |
|---|---|---|---|---|
| DE | 31 30 484 | * | 2/1983 | .................. 82/160 |
| EP | 0 065 659 | * | 12/1982 | .................. 83/160 |
| EP | 0303346 | | 2/1989 | |
| EP | 0426097 | | 5/1991 | |
| EP | 0449785 | | 10/1991 | |
| EP | 0785054 | | 7/1997 | |
| GB | 1094072 | | 12/1967 | |
| JP | 62-140763 | * | 6/1987 | ................. 451/342 |

* cited by examiner

Primary Examiner—Clark F. Dexter
(74) Attorney, Agent, or Firm—Dilworth & Barrese LLP.

(57) ABSTRACT

A device for attaching two units (17,18) provided for rotation in unison about an axis, having axial and radial attachment of the units relative to each other. The attaching involves first engagement members (28,29) engageable with each other and provided on the first and second units, the engagement members being arranged to cause engagement with each other by radial relative moment between the units (17,18).

19 Claims, 6 Drawing Sheets

ATTACHING DEVICE

BACKGROUND OF THE INVENTION AND PRIOR ART

This invention is related to a device for attachment of two units provided for rotation in unison about an axis, said device comprising means for axial and radial attachment of the units relative to each other. The invention is intended to be used universally for attaching units of arbitrary nature. A presently preferred use is, however, that a first of the units is rotatably supported in a carrier forming part of a sawing machine whereas the second of the units comprises or is provided for connection to a sawing tool.

Conventional prior art in connection with such a sawing machine is that the sawing machine comprises a threaded pin on which a saw blade is threadable by a hole provided in the blade. A nut is caused to engage with the threaded pin so as to press the saw blade against a support surface arranged around the threaded pin. A non-threaded portion of the threaded pin itself and the edge of the hole in the saw blade may serve for centering the saw blade or, alternatively, the sawing machine and the sawing blade may be provided with any other type of centering arrangement to ensure that the axis of rotation of the saw blade will coincide with the axis of rotation of the rotatable unit of the sawing machine. Another mode of fixing the saw blade is that the saw blade presents a central hole, in which a projectioin on the rotatable unit of the sawing machine may be received while guiding the saw blade, whereas the saw blade itself is fixed to the rotatable part of the sawing machine by a rim of shrews externally of the projection.

In all embodiments known so far, the structure has been such that it has been necessary, in order to establish the engagement between the sawing blade and the movable unit of the sawing machine, to move the saw blade considerably along the axis of rotation. This requires a considerable space. In connection with such sawing machines, for example, which are intended for sawing in concrete and similar and which are moved along the surface, in which sawing cuts are to be provided, there is a need for placing sawing cuts very close to adjoining walls, floors or ceilings. In such a case a need for replacement of the blade may necessitate dismounting of the entire sawing machine from the guide, which is time consuming and laborious.

SUMMARY OF THE INVENTION

The object of the present invention is to devise ways to develop the device for attachment of two units provided for rotation in unison about an axis, the device comprising means for axial and radial attachment of the units relative to each other so as to eliminate or at least reduce the disadvantage discussed hereinabove. Thus, the invention alms at creating improved possibilities to replace one of the two units, the unit to be replaced possibly being formed by the saw blade discussed above, without the replacement necessitating a considerable free space in the axial direction.

This object is fulfilled according to the invention by designing the device such that the attaching means comprise first engagement members engageable with each other and provided on the first and second units, said engagement members being adapted to be caused to engage with each other by a radial relative movement between the units. This creates possibilities to bring the units into mutual engagement with a minimum requirement for space in the axial directions.

It is preferred that the first and second units comprise engaging second engagement members adapted to radially guide the units relative to each other. In this way efficient radial guiding, i.e. centering, of the units relative to each other is ensured despite the fact that the units are brought into engagement with each other by a radial relative movement.

SHORT DESCRIPTION OF THE DRAWINGS

Further preferable designs of the invention and advantages associated thereto are dealt with more closely in the appendent description, in which reference is made to the enclosed drawings, in which.

DETAILED DESCRIPTION OF A PREFERRED EMBODIMENT

The device according to the invention will hereunder be exemplified as being used in a sawing machine to attach a saw tool to the same. However, it is pointed out that also other attaching uses of the invention are within the scope thereof.

Figure 1:
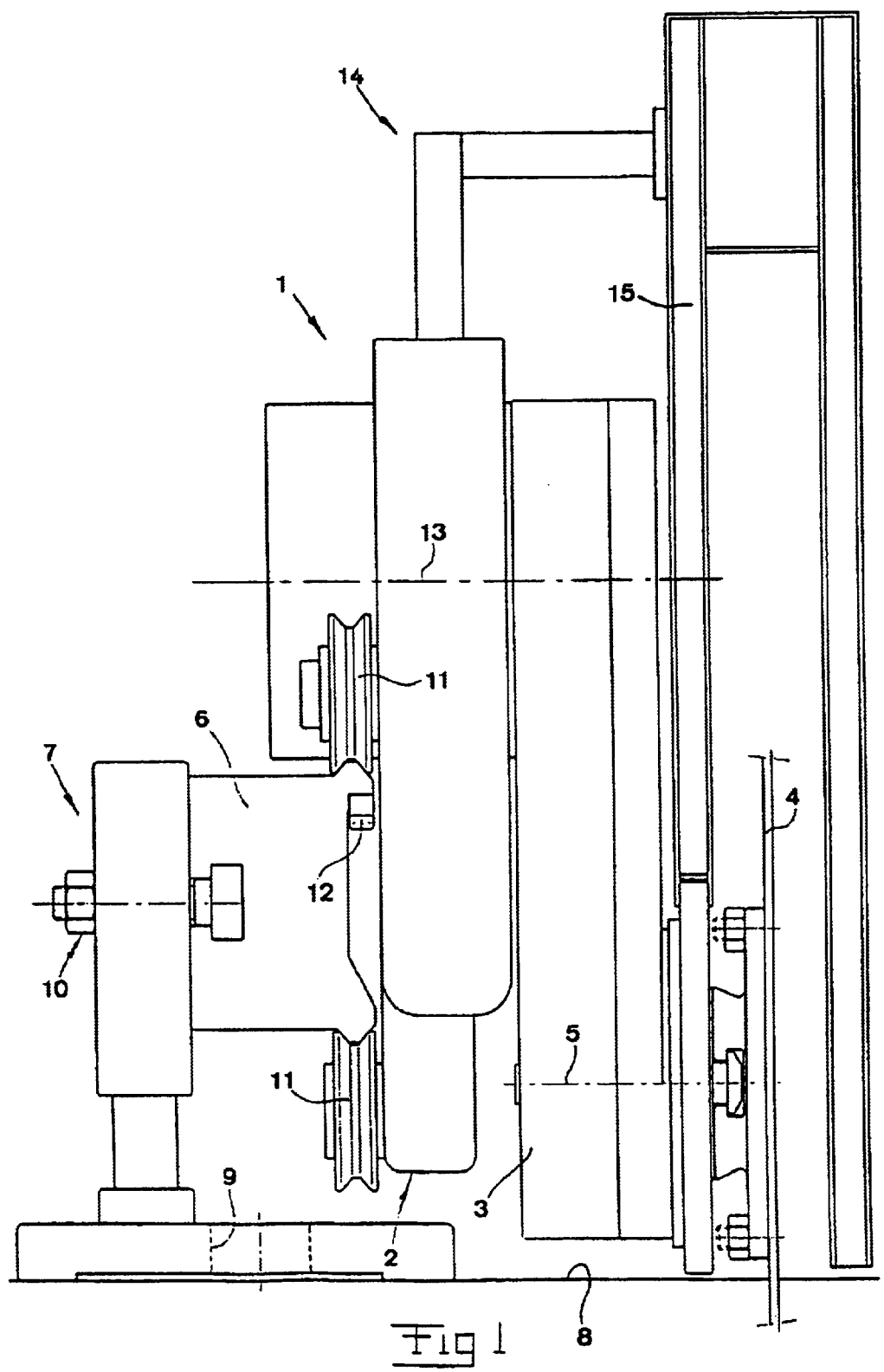
FIG. 1 is an exterior view illustrating a sawing machine, in which the device according to the invention is incorporated.

FIG. 1 illustrates a sawing machine generally denoted 1. The machine comprises a body 2 having a carrier 3 for a sawing blade 4. As will be described more closely hereinafter, the sawing machine comprises means to drive the sawing blade 4 in rotation about an axis 5.

Although the invention also is useful in other types of sawing machines, the type illustrated here is intended to be displaced along a guide 6, which is securable, by suitable holding members 7, in a suitable manner relative to the surface 8 to be provided with a saw cut. In the example the holding members 7 are arranged to enable securing of the guide 6 on this surface 8. For this purpose, each holding member 7 comprises means to secure the holding member to the surface 8, said means for instance consisting of holes 9, in which bolts are introducable. Furthermore, there are means to secure the guide 6 to the holding members 7. These securing means may have the character of bolt connections 10.

The guide 6 has suitably the shape of a rail. The body 2 of the sawing machine 1 comprises suitable means for guiding engagement with this rail. In the example it is illustrated that the body 2 comprises guide wheels 11 engaging guidingly with the rail. Thus, the sawing machine body 2 is intended to be movable in translation along the rail 6. In order to move the sawing machine body 2 along the rail 6, a driving device suitable for the purpose is provided. This device comprises in the example a cogway 12 provided on the rail 6, a driven member in the form of a drive wheel, in particular a gear wheel (not shown), provided on the sawing machine body 2 engaging with ths cogway so that the body will be displaced along the rail 6 on rotation of the drive wheel provided on the body 2. In order to bring the drive wheel in rotation, a manual driving device may be present but it is also possible to provide a suitable motor on the body 2 to carry out driving of the drive wheel.

The carrier 3 is intended to be movable relative to the sawing machine body in the example. This mobility is here exemplified as pivotable mobility about a pivot axis denoted 13. This pivot axis, 13 is as appears from FIG. 1 substantially parallel to the axis 5 of rotation of the sawing blade.

By pivoting the carrier 3 formed like an arm about the pivot axis 13 the axis 5 of rotation of the sawing blade may be moved in an arc shaped movement around the pivot axis 13 of the carrier 3 since there is a radial distance present between the pivot axis 13 and the axis 5 of rotation.

It is also indicated in FIG. 1 that a protective device denoted 14 is provided. This protective device comprises a hood-like protection denoted 15 and more or less enclosing the sawing blade 4. The protective device 14 does not form a part of the present invention and will not be descirbe further.

Figure 2:
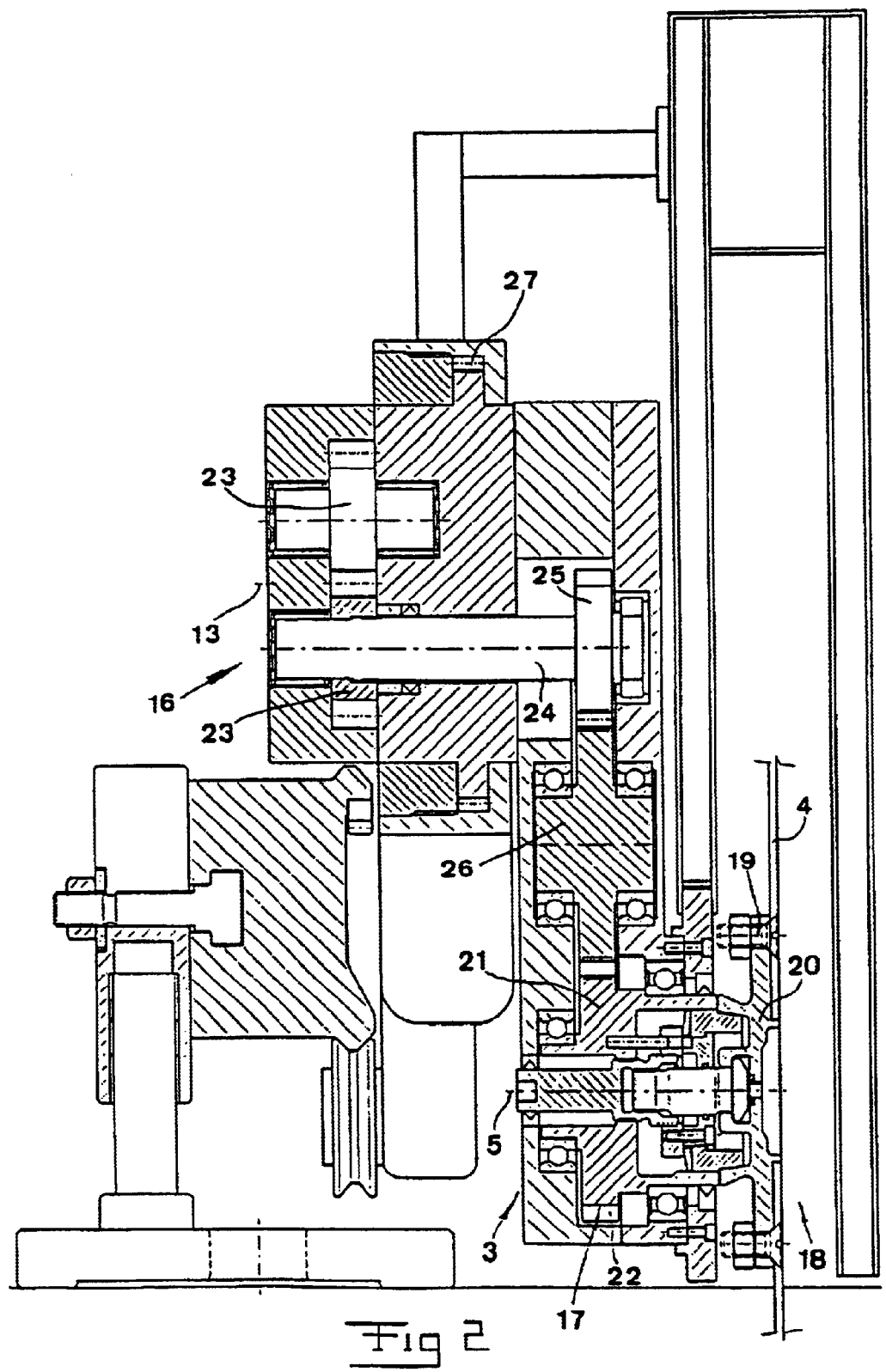
FIG. 2 is a view similar to FIG. 1 but partly cut to illustrate, more specifically, the structure.

FIG. 2 illustrates more clearly the design of the arm like carrier 3. It also appears diagrammatically that the drive motor to put the sawing blade 4 in rotation about the axis 5 is housed in a portion of the carrier 3 located in the area of the pivot axis 13. 17 denotes hereafter a first unit 17, which is rotatably arranged in the carrier 3 and to which unit 17a second unit denoted 18 is intended to be attached. This second unit 18 comprises the previously mentioned sawing blade 4 and a holder which is denoted 20 and which either may have the character of a separate component connectable to the sawing blade 4, for instance by means of screw connections 19 or other securing means, but which as an alternative may be designed in one piece with the sawing blade 4.

As will be discussed more closely hereafter, the first unit 17 comprises a base part denoted 21. This is rotatably supported in the carrier 3 by bearings. The base part 21 comprises means to be put in rotation. This means comprises in the example a gear rim 22.

The driving device 16 previously described is in the example realised as a hydraulic pump of a gear wheel type. More specifically, the motor comprises two gear wheels 23 in meshing engagement with each other. These gear wheels are rotatably supported in spaces in the carrier 3 and hydraulic fluid is supplied to these spaces such that the gear wheels 23 are put in rotation. One of these gear wheels is secured against relative rotation to an axle 24, on which a gear wheel 25 is secured so as to be prevented from relative rotation thereto. The gear rim thereof engages with a further gear wheel 26 placed between the gear wheel 25 and the base part 21 provided with the gear rim 22 such that rotation of the axle 24 is conveyed to the base part 21 via the gear wheel 25 and the gear wheel 26.

There are suitable means for bringing the carrier 3 into a pivoting movement around the axis 13. These means may either be hand operated or motor driven. Although many alterative are present for the design of such driving means, the carrier 3 may according to a possible embodiment comprise a gear rim 27, a suitable wheel, for instance a gear or a worm wheel, rotatably supported in the body 2 of the sawing machine engaging with this gear rim 27. This wheel could be put into rotation by a manual crank device or a suitable drive motor provided on the body 2. In this regard, it is preferred that the carrier 3 is pivotal at least one and preferably several turns around the axis 13 even if embodiments with pivoting movements restricted to less than one turn are conceivable.

Figure 3:
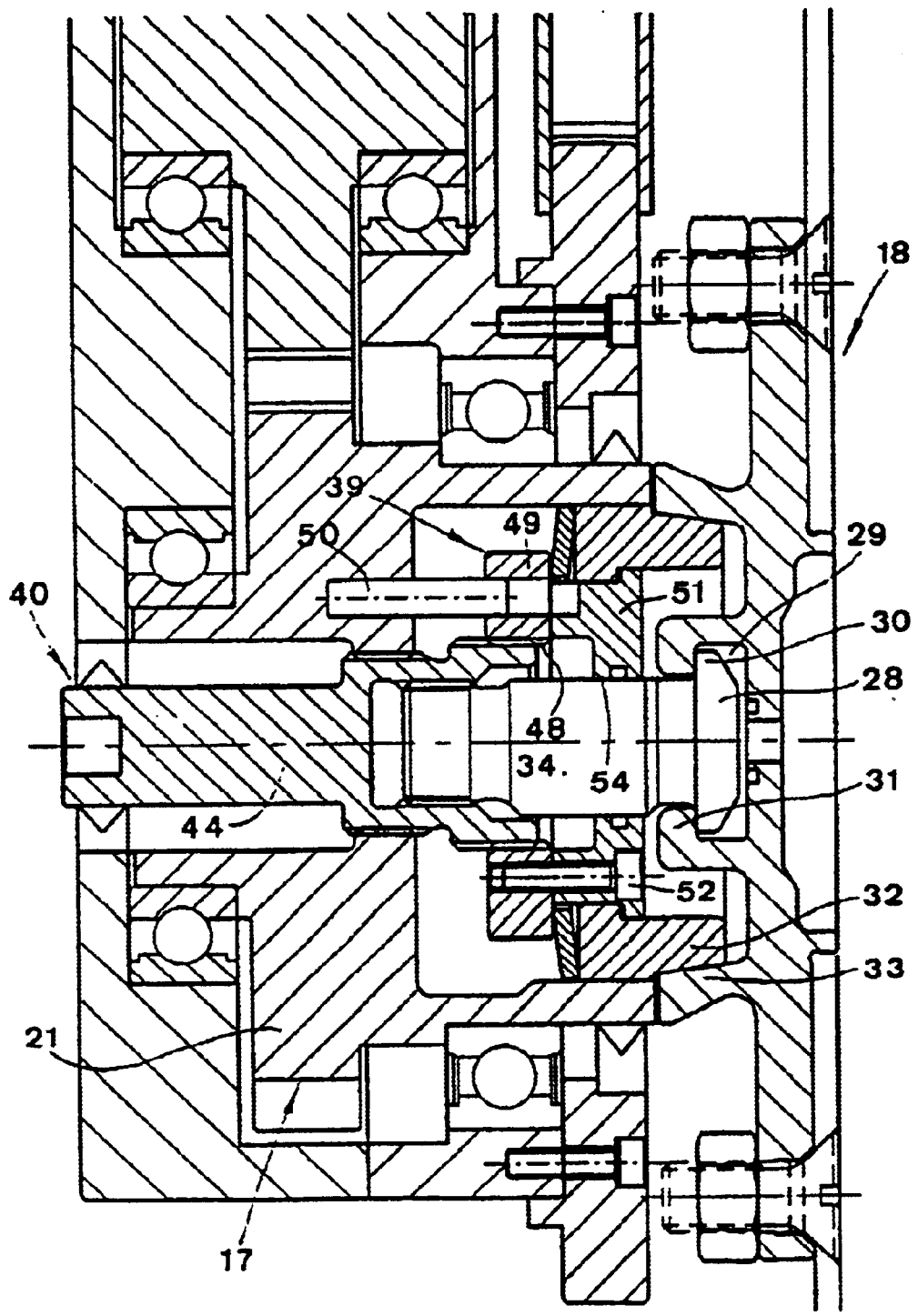
FIG. 3 is a view illustrating a part of FIG. 2 in enlarged scale.

The means for attaching the units 17, 18 to each other comprises first engagement members 28 and 29 respectively (FIGS. 3, 4 and 6) engaging with each other and provided on these units. These engagement members are adapted to be brought into engagement with each other by a radial relative movement between the units 17, 18. It is pointed out already now that the engagement member 28 has the character of a head whereas the member 29 has the character of a substantially radial groove (see in particular FIG. 6) receiving the head. It is then a condition that the groove has such a design that the head 28 will be present, with sidewardly projecting portions 30, behind such portions 31 which delimit the groove 29 such that a traction force transmitting engagement between the head and the groove may be established (see FIG. 3).

Besides, the first and second units 17, 18 comprise mutually engaging second engagement members 32 and 33 respectively adapted to radially guide the units relative to each other. The engagement members 32, 33 comprise suitably conical guiding surfaces engaging with each other. The engagement members 32, 33 should be designed so as to be able to center the units 17, 18 relative to each other. With respect to the engagement member 33, it is pointed out that it is provided with an interruption indicated at 34' in the embodiment example (see in particular FIG. 6) illustrated. This interruption 34' is aligned with the groove 29 and can be said to form a part thereof. The interruption 34' is required to enable the head 28 to be able to freely disengage, when it is moved outwardly from its innermost position in the groove 29, from its engagement with the unit 18, i.e., its holder 20 illustrated in FIG. 6.

Figure 5:
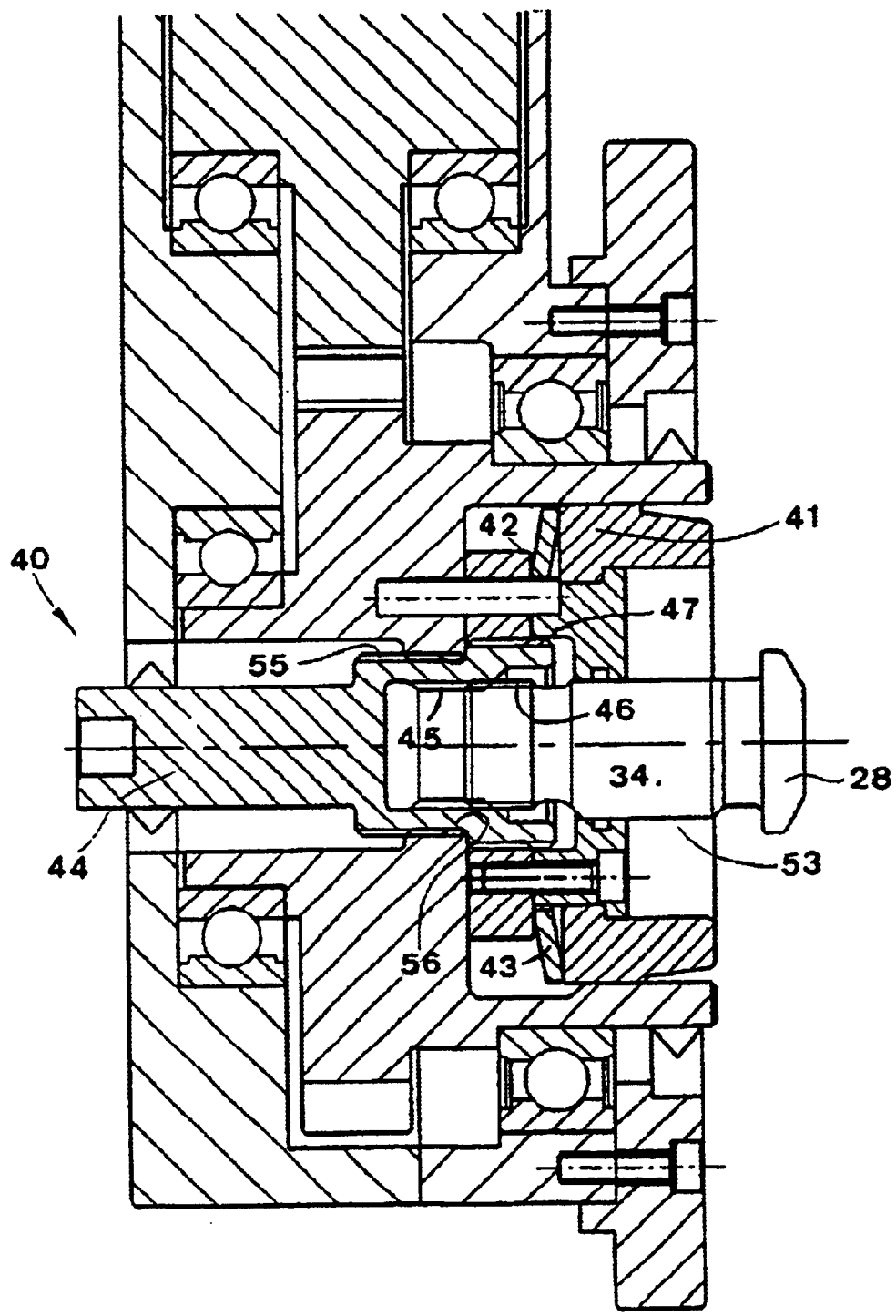
FIG. 5 is an enlarged detail from FIG. 4.

The first engagement member 28 of the unit 17 is arranged on an element 34 (FIGS. 3 and 5) moveable relative to the base part 21.

Figure 6:
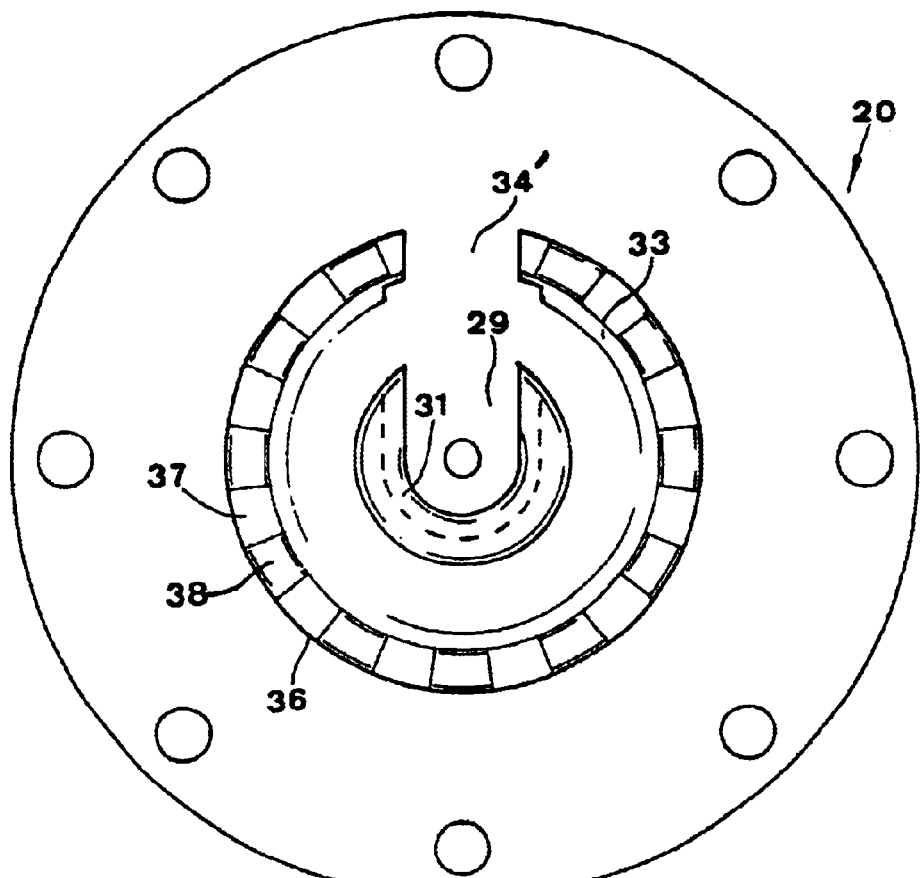
FIG. 6 is a front view of a holder included in the saw blade unit.

The units 17 and 18 comprise (FIG. 4) contact members 35, 36 arranged to be in contact with each other when the first engagement members 28, 29 activate the units 17, 18 towards each other. The contact members 35, 36 could according to a first possible embodiment supply consist of surfaces suitable for contacting each other so as to define the most close position of the units 17, 18. However, it is preferred in the example that the contact surfaces 35, 36 are able to contribute or provide torque transmission between the units 17, 18. For this purpose the contact members 35, 36 could for instance present surfaces suitable for forming a friction connection. However, it is preferred according to the invention that the contact members 35, 36 are designed so as to be able to execute a form locking function. For this purpose it is preferred that the contact members are provided with torque transmitting projections and recesses respectively matching each other. It is indicated in FIG. 6 that there are projections and recesses 38, 37 respectively on the contact member 36.

The second engagement member 32 of the unit 17 is provided on an arrangement 39 (FIG. 3) moveable relative to the base part 21.

A movement arrangement 40 is adapted to the moveable element 34 relative to the base part 21 so as to actuate, by the first engagement members 28, 29, the units 17, 18 towards each other and cause their contact members 35, 36 to contact each other. The movement arrangement 40 is adapted to provide a relative movement between the first and second engagement members 28, 32 on the first unit 17, said relative movement causing movement/tightening of the first as well as the second engagement members 28, 29, 32, 33 of the two units 17, 18 towards/against each other.

The moveable arrangement 39 comprises two pieces 41 and 42 axially mutually moveable. At least one spring 43 is coordinated with these pieces 41, 42 (see FIG. 5) so as to be tensioned when the second engagement members 32, 33 are actuated into engagement with each other. As can be seen from the figures, the spring 43 is in the example a disk spring but also other spring types may be used according to the invention. The task of the spring 43 is to be tensioned when the engagement members 32, 33 enter into engagement with each other such that a remaining spring tensioning of the members 32, 33 against each other is achieved.

Figure 7:
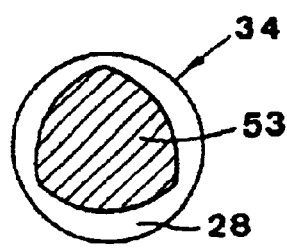
FIG. 7 is a section along the line VII–VII in FIG. 4.

The movement arrangement 40 is adapted to move the moveable arrangement 39 relative to the base part 21 so as to bring the second engagement members 32,33 into engagement with each other. More specifically, the movement arrangement comprises in the example a rotatable movement member 44. This engages, by a first internal thread 45 with an external thread 46 of the element 34. The movement member 44 engages, by a second external thread 47, with an internal thread 48 of the moveable arrangement 39. The element 34 and such a portion 49 of the arrangement 39 which is provided with the thread 48 are prevented from rotation relative to the base part 21. For this purpose, arbitrary means may be used but it is proposed in the example that these means consist of a guide pin 50, which is arranged in the base part 21 and which extends in a hole provided in the portion 49 so that the portion 49 and the base part 21 are rotationally locked to each other. The portion 49 is included in the previously mentioned piece 42, which also comprises a ring piece 51 connected to the portion 49, for instance by screws 52, so as to be prevented from relative rotation thereto. It appears from FIG. 7 that the element 34 according to the section VII–VII in FIG. 4 has an unround cross section of a shaft portion denoted 53. This unround cross section is axially slidably received in an opening 54 provided in the ring piece 51. As a consequence of the corresponding external shape of the shaft portion 53 and the internal shape of the opening 54, the element 34 will be locked against rotation relative to the ring piece 51, portion 49 and via the guide pin 50 also relative to the base part 21. In the example the unround cross section of the shaft portion of the element 34 is substantially triangular with triangle sides which are convexly rounded.

The threads 45/46 and 47/48 are designed to cause movement of the element 34 and the arrangement 39 in opposite directions on rotation of the movement member 44.

The movement member 44 engages, by a third external thread 55 with an internal thread 56 of the base part 21. The directions and pitches as concerns the threads 45 and 55 of the movement member 44 and the corresponding threads 46 and 56 of the element 34 and the base part 21 respectively are such that the moveable element 34, on rotation of the movement member 44 moves in relation to the base part 21 in a direction opposite to the direction of movement of the rotatable movement member 44. Expressed in other words, this means that the threads 45 and 55 have the same direction but that the pitch of the thread 45 is larger that the pitch of the thread 55. In this way the movement member 44 will, on rotation thereof, be moved in a certain direction whereas the element 34 simultaneously is moved in the opposite direction to a larger extent.

The directions with respect to the second 55 and third 47 threads of the movement member are such that both of these threads give rise to movement components in the same direction and these are added to each other. Accordingly, the threads 55 and 47 should be oppositely directed. The pitch of the threads 47, 55 may suitably be substantially equal but this is not necessary.

Figure 4:
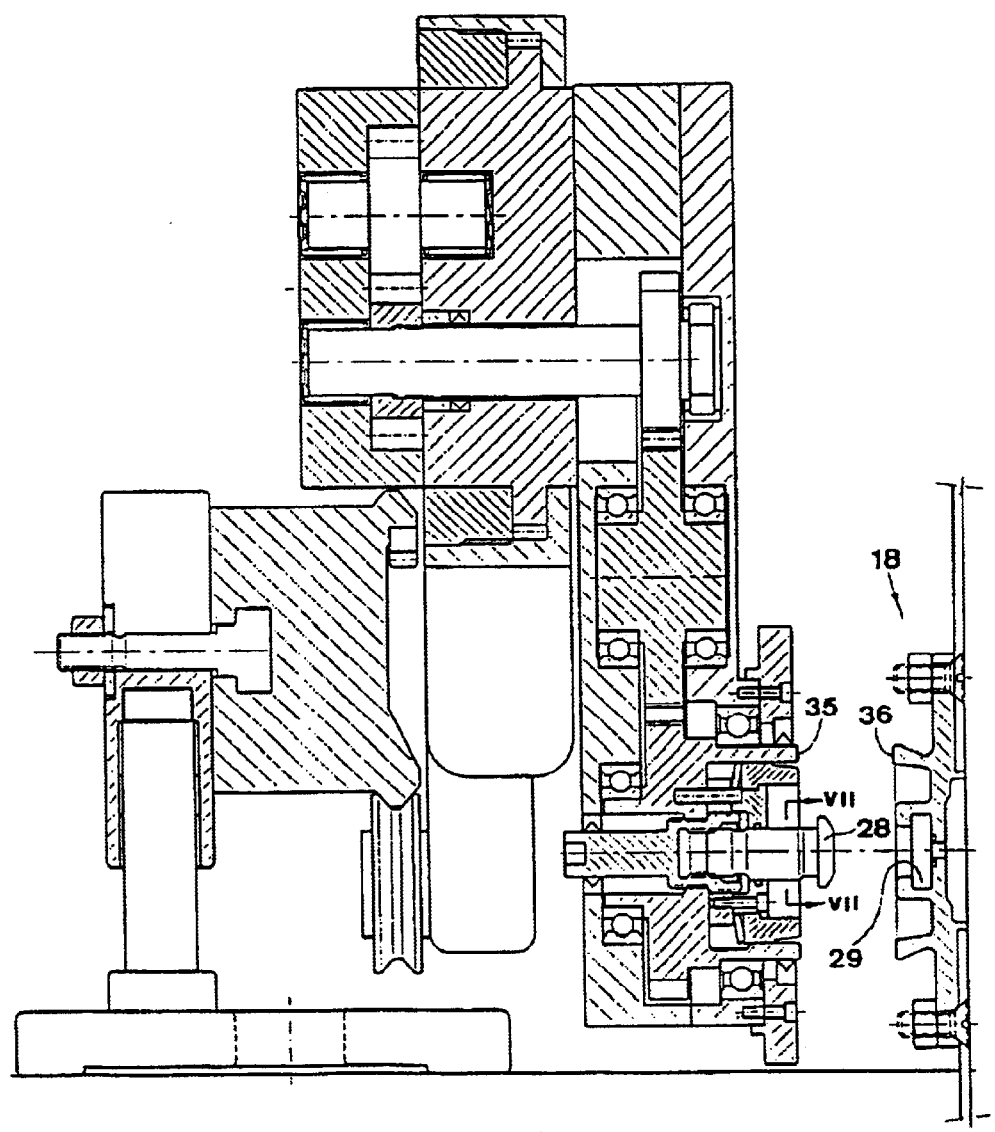
FIG. 4 is a view similar to FIG. 2 illustrating the saw blade removed from the sawing machine.

When attaching the units 17, 18 to each other the following occurs starting from the position according to FIG. 4. The holder 20 contained in the element 18 is located eccentrically relative to the element 34 and is then moved radially relative to the element 34 so that the head 28 thereof may pass through the interruption 34' in the engagement member 33 of the holder 20. By continued radial movement of the holder, the head 28 will be located in an end position in the groove 29, in which end position the head 28 is located substantially centered relative to the holder 20. In this end position peripheral portions 30 of the head 28 are located behind portions 31 delimiting the groove 29. With the head 28 in the central end position in the groove 29, the movement member 44 is then rotated. This rotation causes two circumstances:

1. The element 34 and the head 28 located thereon are moved to the left in the figures relative to the base part 21 so that accordingly the holder 20 will be drawn to the left. The movement of the element 34 is a consequence of the described designs with respect to the threads. The movements of the element 34 and the holder 20 to the left in the figures mean that the contact members 35, 36 will be placed in contact with each other such that a form locking torque transmitting engagement is established.

2. The rotation of the movement member 44 causes the moveable arrangement 39 to be moved in a direction to the right in the figures, which means that its engagement members 32 are projected to the right in the figures to a centering engagement with the corresponding engagement member 33 on the holder 20. At the end of the rotation of the movement member 44, the spring 43 will be tensioned so that the engagement member 32 will be actuated into engagement with the engagement member 33 with a resilient force. Thus, the engagement members 32, 33 will abut resiliently against each other whereas the contact members 35, 36 abut unresiliently against each other. As soon as the engagement member 32 has been projected so far that its portions located outermost are present radially inwardly of the engagement member 33, the holder 20 is locked against radial movement relative to the element 34 and the arrangement 39. Thus, the head 28 can not leave the engagement with the groove 29. This also means that the head 28 substantially only provides for axial pressing of the units 17, 18 against each other whereas the engagement members 32, 33 provide for the radial guiding of them.

When the sawing blade is to be released, the movement member 44 is rotated in the opposite direction, suitably by a key engageable with the movement member. This means that the element 34 will be put in a rotation to the right in the figures whereas the arrangement 39 will be drawn to the left. The engagement members 32, 33 disengage. When the moveable arrangement 39 has been retracted so far that the engagement members 32, 33 no longer are in engagement with each other (FIGS. 4 and 5) the holder 20 may be released by radial movement causing the head 28 of the element 34 to exit out of the groove 29.

It is pointed out that piece 41 of the moveable arrangement 39 which comprises the engagement member 32 is moveable relative to the other piece 42 so that the spring 43 between these two pieces 41, 42 may be tensioned and relieved respectively. For this purpose, the piece 41 is suitably received so as to be restrictedly axially displaceable relative to the piece 42. Furthermore, it is pointed out that the engagement members 28, 29 are designed such that the units 17, 18 are mutually rotatable. More specifically, this rotatability is present until the contact members 35, 36 are brought into contact preventing rotation with each other. This rotatability between the units 17, 18 simplifies alignment of the contact members 35, 36 when these are of a form locking type.

It is evident that the invention is not only restricted to the embodiment exemplified here. In addition to the embodiment variants already discussed above, numerous further variants are possible to provide for the average man skilled in the art when the basic inventive concept has been presented. As an example of such modifications, it may be mentioned that the engagement members 28, 29 of course could be reversed in the sense that the head 28 could be placed on the holder 20 whereas instead the groove 29 could be provided on the element 34. According to a further example of modification, it is not necessary to have the movement member 44 operating for movement purposes on the moveable arrangement 39 by double sets of threads 55, 56 and 47,48 respectively. Thus, the set of threads 47, 48 could possibly be deleted, which would mean that the movement of the moveable arrangement 39 would only be dependent upon the set of threads 55, 56. According to a further example of modification, the set of threads 47/48 could be maintained while instead the movement member 44 could be made axially undisplaceably supported relative to the base part 21. Thus, the thread set 55/56 could be deleted. This would mean that the axial movement of the moveable element 34 only would be a consequence of the engagement between the threads 45, 46. However, according to the most preferred embodiment, the movement of the moveable element 34 relative to the base part 21 is a consequence of the resultant of the oppositely directed movements generated by the thread sets 45, 46 and 55, 56 respectively since then favorable tightening conditions occur.

What is claimed is:

1. A device for the attachment of two units (17,18) provided for rotation in unison about an axis, said device comprising means for axial and radial attachment of the units (17,18) relative to each other, the attaching means comprising first engagement members (28,29) engageable with each other and provided in first and second units, said engagement members being removably engaged with each other by a relative radial movement between the units, the first and second units (17,18) further comprising second engagement members (32,33) removably engaged with each other and radially guiding the units relative to each other during axial movement of the units towards one another, the first engagement member (28) of the first unit (17) being arranged on an element (34) moveable in relation to a base part (21) of the first unit, the first and second units (17,18) comprising contact members (35,36) that are aligned with each other and contact each other when the first and second units are moved towards each other, a movement arrangement (40) operatively connected to the moveable element (34) and the base part (21) for moving the moveable element (34) relative to the base part (21) of the first unit (17) so as to actuate, by relative movement of the first engagement members (28,29), the units towards each other and bring their contact members (35,36) into contact, wherein the second engagement member (32) of the first unit (17) is provided on a moveable arrangement (39) which is moveable relative to the base part (21) of the first unit (17).

2. A device according to claim 1, wherein the contact members are provided with torque transmitting and matching projections (38) and recesses (37) respectively.

3. A device according to claim 2, wherein the operative connection of the movement arrangement (40) to the moveable element and to the base part provides a relative movement between the first and second engagement members (28,32) on the first of the units, said relative movement causing movement/tightening of the first (28,29) as well as the second (32,33) engagement members of the two units towards/against each other.

4. A device according to claim 1, wherein the moveable arrangement (39) comprises two pieces (41,42) axially moveable relative to each other and at least one spring (43) is mounted between these pieces to be tightened when the second engagement members (32, 33) of the units are moved into engagement with each other.

5. A device according to claim 1, wherein the movement arrangement (40) is further operatively connected to the moveable arrangement to move the moveable arrangement (39) relative to base part (21) of the first unit and cause the second engagement members (32,33) to move into engagement with each other.

6. A device according to claim 1, wherein the movement arrangement (40) comprises a rotatable movement member (44), which engages, by a first thread (45), with a thread (46) of the moveable element (34) and engages, by a second thread (47), with the thread (48) of the moveable arrangement (39), the moveable element (34) and the portion (49) of the moveable arrangement which is provided with a thread being nonrotatably interconnected to the base part (21), said threads being arranged to cause movement of the moveable element (34) and the moveable arrangement (39) in opposite directions on rotation of the movement member.

7. A device according to claim 6, wherein the movement member (44) engages, by a third thread (55), with a thread (56) of the base part (21), and the directions and pitches of the first and third threads (45,55) of the movement member (44) are such that the moveable element, on rotation of the rotatable movement member, moves in relation to the base part in a direction opposite to the direction of movement of the rotatable movement member.

8. A device according to claim 7, wherein the directions of the second and third threads (47,55) of the movement member are such that these two threads cause movement components in the same direction, said components being added to each other.

9. A device according to claim 1, wherein the movement arrangement (40) comprises a rotatable movement member (44), which engages, by a first thread (45), with a thread (46) of the moveable element (34), the movement member (44) engages, by a further thread (55), with a thread (56) of the base part (21), and directions and pitches of the first and further threads (45,55) of the movement member (44) are such that on rotation of the rotatable movement member, the moveable element (34) moves relative to the base part (21) in a direction opposite to the direction of movement of the rotatable movement member.

10. A device according to claim 9, wherein the connection between the movement member (44) and the moveable arrangement causes the moveable arrangement (39) to move in a direction opposite to the direction of movement of the moveable element.

11. A device according to claim 10 wherein the movement member (44) engages, by a second thread (47), with a thread (48) of the moveable arrangement (39) and the directions of the second and further threads (47,55) of the movement member (44) are such that these two threads cause movement components in the same direction, said components being added to each other.

12. A device according to claim 1, wherein the first engagement member (28) of one of the units has the character of a head whereas the first engagement member (29) of the second of the units has the character of a substantially radial groove receiving the head.

13. A device according to claim 1, wherein the second engagement members (32,33) comprise engaging conical guide surfaces.

14. A device according to claim 1, wherein the first unit is rotatably supported in a carrier (3).

15. A device according to claim 14, wherein the second (18) unit is structured and arranged for connection with a tool (4).

16. A device according to claim 15, wherein the carrier (3) forms part of a sawing machine whereas the tool (4) is a sawing tool.

17. A device according to claim 16, wherein the carrier (3) is rotatably moveable relative to a body (2).

18. A device according to claim 15, wherein the carrier (3) is rotatably moveable relative to a body (2).

19. A device according to claim 14, wherein the carrier (3) is rotatably moveable relative to a body (2).

* * * * *